INVENTOR.
MARSHALL C. BOBRIN

BY

ATTORNEY

United States Patent Office 3,425,032
Patented Jan. 28, 1969

3,425,032
SUBMARINE ANOMALY MARKER
Marshall C. Bobrin, Philadelphia, Pa., assignor to the United States of America as represented by the Secretary of the Navy
Filed Jan. 27, 1967, Ser. No. 613,070
U.S. Cl. 340—4    17 Claims
Int. Cl. H04b 13/00

ABSTRACT OF THE DISCLOSURE

An apparatus for automatically indicating the presence of aperiodic anomaly signal information in a signal-like noise environment. The signal and noise information is passed through noise rejection filters for attenuating the noise signals. The filtered signal is then rectified, sample integrated and impressed on a threshold detector which provides an output only when the amplitude of the integrated voltage exceeds a predetermined level. This output signal then represents the presence of a signal in the signal and noise environment which may be used to actuate a warning device.

---

The invention described herein may be manufactured and used by or for the Government of the United States of America for governmental purposes without the payment of any royalties thereon or therefor.

Background of the invention

The present invention relates to signal recognition and more particularly to the detection and recognition of aperiodic signal anomalies in a signal-like noise environment.

In the field of anti-submarine warfare, it has been the general practice to employ low-flying aircraft equipped with magnetic anomaly detection systems to detect the presence of submerged submarines. Such systems are described in Magnetic Airborne Detectors, volume 5, of Summary Technical Report of Division 6, National Defense Research Committee, 1946. These systems sense variations in the earth's magnetic field that are caused by large metallic bodies such as submarines or mineral deposits below the surface of a body of water. Generally these systems employ magnetometers for detecting the magnetic field variations which are then displayed on a strip chart recorder in the aircraft. This recorder is observed by a trained human operator, who from past experience and training, has the responsibility of selecting those signals which he feels represent the magnetic field of a submarine. The selection, however, is made difficult by the fact that the time of occurrence is unknown (aperiodic) and the background noise is often either signal-like in appearance or large enough in amplitude to obscure the signal. As a result of these factors, the operator either fails to distinguish the submarine from its noise background or does so at a later time, thereby giving rise to error in determining the true coordinates of submarine position, or falsely indicates the presence of a submarine. Further, the operator has other responsibilities during the search operation and while attending to these, he may miss the submarine signal when it does occur. Accordingly, there is a grave need for providing an apparatus which automatically detects the presence of aperiodic submarine signals in a signal-like noise environment and apprises an operator or a computer of this fact so that the coordinates of the submarine may be accurately determined.

The present invention fulfills this need by providing a submarine anomaly marker which receives the signal and signal-like noise data from a magnetometer system and automatically provides an immediate indication of the presence of an anomaly signal. To attain this, the present invention utilizes the output signal information from a magnetic airborne magnetometer system as an input signal. This information or data, however, contains high signal-like noise events which tend to obscure the signal data; accordingly, the input signal data is first passed through noise rejection filters to attenuate this noise. The filtered signal is then full-wave rectified, sample integrated and impressed on a threshold detector. The detector provides an output only when the amplitude of the integrated signal voltage exceeds a predetermined level; this output signal is then an indication of the presence of a submarine and may be used to mark a display circuit, provide audio or visual warning to an operator or act as an input signal to a computer. The coordinates of the submarine may then be determined with a minimum amount of error. To prevent aircraft maneuvers from causing the submarine anomaly marker to falsely indicate the presence of a submarine, an inhibit circuit is provided which disables the marker whenever the magnitude and rate of the aircraft maneuvers exceed certain values.

An object of the invention is therefore to provide an apparatus which automatically detects the presence of aperiodic signal anomalies in a signal-like noise environment and to provide an indication of the presence of the signal, wherein the level of confidence in the signal indication is proportional to the amplitude of the detected signal.

Description of preferred embodiment

Figure 1:
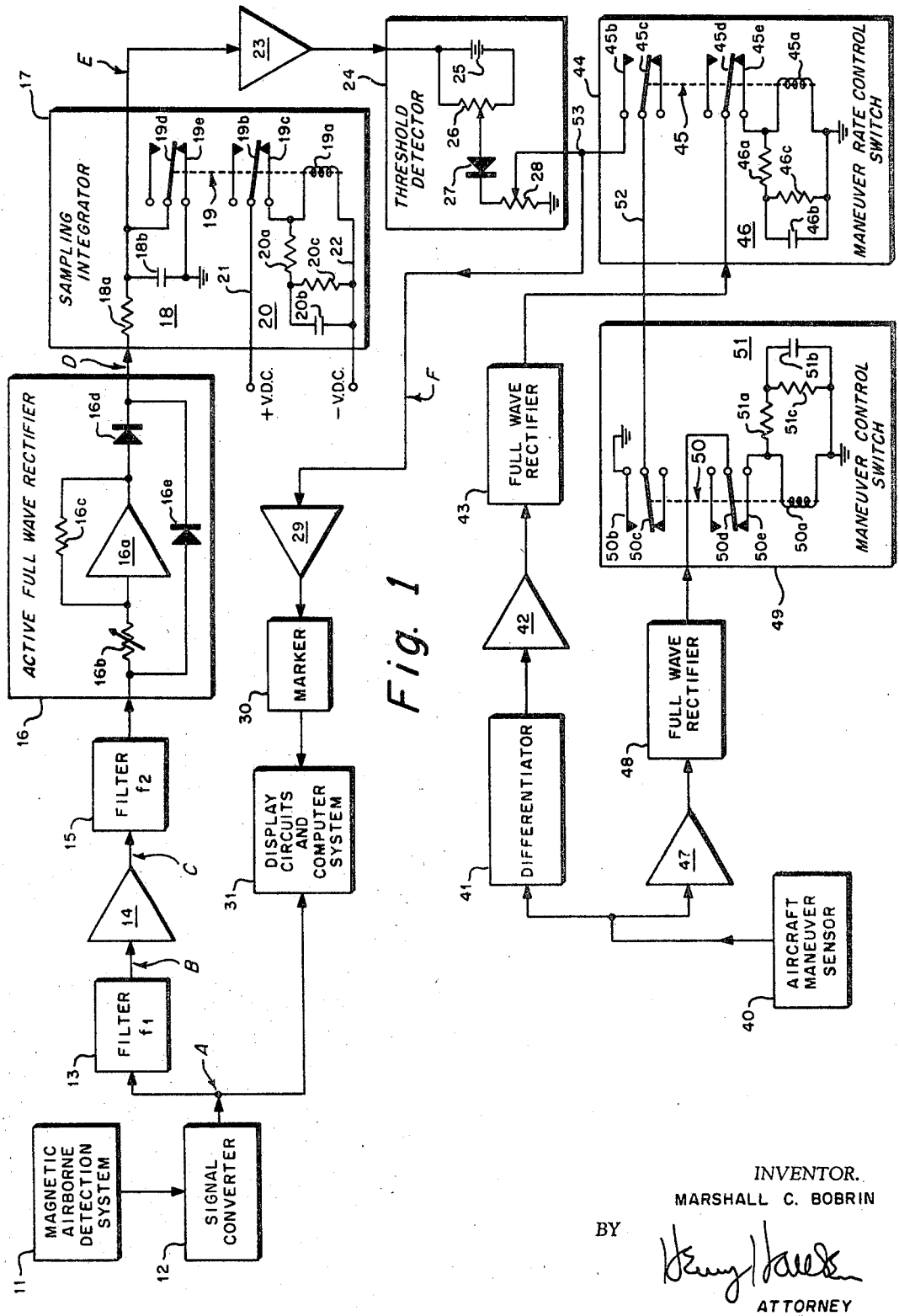
FIG. 1 illustrates a partial schematic and block diagram of an embodiment of the invention.

Referring now to FIG. 1, there is shown a magnetic airborne detection system (MAD) 11, which is used to detect the presence of submarines by sensing the variations in the earth's magnetic field caused by the metallic structure of the submarine. As described previously, magnetometers are employed for this purpose. These devices, however, being sensitive to magnetic field variations over a particular frequency band, sense magnetic variations from sources other than submarines. These sources give rise to noise signals which, in the case of a MAD system, can be classified into four main categories: (1) transient electrical fluctuations in the aircraft electrical system; (2) magnetometer equipment noise; (3) geologic noise caused by mineral deposits and (4) aircraft maneuver noise. The first three categories of noise are of a quasi-sinusoidal nature and may be attenuated by single frequency rejection filters centered about the fundamental frequencies of the noise. It has been found, however, that the frequency of the geologic noise sources and the submarine signal sources are functions of the aircraft's speed. Further, the magnetometer equipment noise and the aircraft transient electrical noise have been found to be of substantially the same frequency, do not vary with aircraft speed, and are of higher frequency than that of the geologic noise. These latter noise events are closest in frequency to the submarine signal frequency and are most likely to generate false alarms. As a result, when the submarine signal frequency changes with a change in aircraft speed, the filter frequency is also changed to accommodate shift in the signal spectrum.

The output from the magnetic airborne detection system 11 is electrically connected to a signal converter 12 which converts the floating or balanced magnetometer signal to a grounded or unbalanced signal for use in the following stages. The signal converter may comprise a mechanical or electrical chopper and associated filter networks for preventing the chopping frequency and extraneous chopper noise from passing into the following stages. The output of the converter 12 is connected to a noise rejection notch-type filter 13 for attenuating the quasi-sinusoidal geologic noise, $f_1$. The output of this filter is coupled through an amplifier 14 to another noise rejection filter 15 for attenuating the magnetometer equipment noise and the aircraft transient fluctuation noise, $f_2$. The amplifier 14 provides isolation between the two filters and compensates for the insertion losses of both filters and the signal converter.

Figure 3:
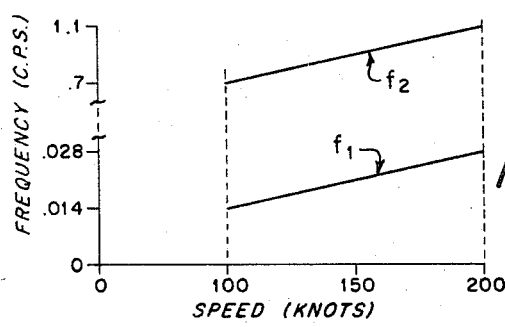
FIG. 3 is a plot of noise rejection filter center frequency vs. speed of a typical aircraft.

FIG. 3 illustrates the necessary center frequency for filters 13 and 15 as a function of aircraft speed. For example, if the aircraft speed is 100 knots, then the noise rejection filter 13 should have a notch centered about 0.014 cycle per second and filter 15, 0.70 cycle per second. The design of such filters are well known to those skilled in the art and accordingly, will not be described herein. Further, since the frequency of the noise is a function of the aircraft speed, obviously a speed sensing device could be used in conjunction with a servomechanism to continuously vary the notch in accordance with the aircraft speed, if such were desired.

The output of the noise rejection filter 15 is coupled to a full-wave rectifier 16 for converting the filtered signal to unidirectional pulses or lobes. Since very low frequency signals are involved, it is not practical to use a transformer-coupled rectifier and therefore an active rectifier is used. This rectifier consists of an operational amplifier 16a with an adjustable input resistor and a feedback resistor 16c to form a variable gain feedback amplifier. The output of this amplifier is connected to the anode of a diode 16d. In parallel with the feedback amplifier 16a and series connected diode 16d is a second diode 16e poled in the same direction as diode 16d. In this manner, positive signal excursions are coupled directly to the output of the rectifier through diode 16e whereas negative signal excursions are first inverted through the feedback amplifier and then passed through diode 16d as positive signal excursions thereby providing full-wave rectification.

The output of the full-wave rectifier 16 is then coupled to a sampling integrator 17 having a resistor 18a connected to an integrating capacitor 18b. The time constant of the integrating network is adjusted such that over the sampling period, linear integration is achieved. In order that a sampling function may be provided, as will be described hereinafter, it is necessary to alternately allow a period of time for integration of the rectified signal and then a period of time for discharge of the capacitor 18b so that another sampling period may commence. To this end a discharge circuit 19 is provided. Either mechanical or electronic switching devices can be utilized for this function; however, for purposes of simplicity, a double-pole double-throw mechanical relay arrangement is illustrated.

The discharge circuit 19 comprises a relay coil 19a and a first set of contacts 19b and 19c and a second set of contacts 19d and 19e. Contacts 19b and 19d are illustrated in the deenergized condition. Contact 19b is connected by a conductor 21 to a positive terminal of a voltage source and contact 19c is connected to one end of the coil winding 19a with the other end thereof connected by a conductor 22 to the negative terminal of the DC voltage source. Parallelly connected with the ends of the coil winding 19a is a timing network 20 comprising a resistor 20a serially connected with a capacitor 20b. In parallel with the capacitor 20b is a resistor 20c for providing a current leakage path for the capacitor.

With a DC voltage applied to the timing network 20 as illustrated, the capacitor 20b will charge to the supply voltage through the first set of contacts 19b and 19c and resistor 20a. At the same time the DC voltage will be applied through contacts 19b and 19c to the coil winding 19a thereby energizing this winding and causing contacts 19b and 19d to be switched to the energized position. Since contacts 19b and 19c are no longer electrically connected, the relay coil 19a would become deenergized but for the current supplied from capacitor 20b. Accordingly, the relay coil 19a remains energized until the voltage on capacitor 20b drops below the holding level of the relay coil. The holding time may be adjusted merely by changing the value of resistor 20a or capacitor 20b. During the energized condition of the relay coil, relay contacts 19d and 19e are no longer in contacting relationship and no longer provide a shorting path across capacitor 18b, thereby allowing time for integration on the capacitor as will be described below.

The output of the sampling integrator 17 is electrically connected to an amplifier 23 which amplifies the integrated voltage from capacitor 17b. The output of this amplifier is connected to a threshold detector 24 which provides an output signal having an amplitude proportional to the difference in voltage between the applied signal from amplifier 23 and an internal voltage provided by a battery 25 and potentiometer 26 parallelly connected to form a voltage divider. The positive terminal of the battery 25 is connected to the output of amplifier 23 and the negative terminal is connected to one end of the potentiometer 26. The variable contactor of the potentiometer 26 is connected to the anode of a diode 27, the cathode of which is connected to one terminal of a potentiometer 28. The other terminal of the potentiometer 28 is connected to a ground potential. By this arrangement, the battery 25 and parallelly connected potentiometer 26 provide an adjustable reverse bias voltage for diode 27, such that diode 27 will not conduct in the forward direction until a signal voltage (from amplifier 23) greater than the reverse bias voltage and forward conduction voltage of the diode is exceeded. In this way, an adjustable threshold level is established and the amplitude of the output signal voltage is made adjustable by the potentiometer 28.

The output of the threshold detector 24 is then electrically connected to an amplifier 29 which amplifies signals exceeding the threshold level. The output of this amplifier is connected to a marker circuit 30, which upon receiving a signal from amplifier 29, provides an output to a display circuit and computer system 31. The amplitude of the marking signal is an indication of the relative signal strength of the signal detected by the magnetic airborne detection system. Accordingly, the amplitude of this signal provides a relative indication of the level of confidence which may be placed on this signal marking.

From the overall arrangement of electrical elements thus described, it can be seen that three of the four main categories of noise sources have been accounted for and their effects minimized. The aircraft maneuver noise, however, is not only signal-like in character, but has the same frequency content, amplitude and wave shape as submarine signals. Accordingly, filtering is relatively ineffective in attenuating these noise events without also adversely affecting the detection capability of the system. Failure to eliminate the effects of maneuver noise will provide a large number of false target indications or false alarms; therefore, to overcome this problem, the aircraft maneuvers are sensed relative to a straight and level flight and if the maneuver exceeds a predetermined value, it is utilized to provide an inhibit function which precludes the amplifier 29 and marker 30 from marking the display circuitry as described previously.

Of the three possible types of aircraft motion, the one which has the greatest effect on system performance is that of aircraft roll. This is a direct result of the tactical mission of the aircraft; that is, the aircraft is to maintain a relatively straight and level course with only turn maneuvers being of appreciable magnitude and rate. Roll maneuvers may be resolved into two components: the dynamic or transient portion and the static portion. The dynamic portion is physically realized when the aircraft rolls in or out of a turn, whereas the static portion occurs when the turn itself is being executed.

As the aircraft rolls into a turn, the wing bank angle $\theta$ (an angle formed by an imaginary line passing through the wings of the aircraft and a line parallel to the horizon) is changing at some rate $\dot{\theta}$ unequal to 0, where $\dot{\theta}$ is equal to the rate of change of $\theta$ per increment of time $(d\theta/dt)$. After reaching the desired wing bank angle, $\theta$ is constant and therefore, $\dot{\theta}$ is equal to 0. During this static portion of the turn, the only maneuver noise that is generated is that due to the turning rate of the aircraft which usually does not exceed the low frequency bandpass of the magnetometer and accordingly will not appear as an input signal to the submarine anomaly marker.

The only portion of the roll maneuver which gives rise to signal-like noise events and hence false target indications, is that generated during the dynamic portion of the maneuver. Since the dynamic portion of the turn in general requires less time than the static portion, it is possible to minimize the number of false alarms without appreciably degrading the system performance by inhibiting the output of the threshold detector whenever $\theta$ and $\dot{\theta}$ exceed a predetermined level.

This inhibit function is provided by an aircraft maneuver sensor 40 which has the capability of providing an output signal which is proportional to the wing back angle $\theta$. This signal is then applied to two separate processing channels. The first channel comprises a differentiator 41 which differentiates the output signal from the sensor and provides a voltage proportional to the slope of the sensor signal, $\dot{\theta}$. This signal is amplified in an amplifier 42 and then electrically connected to a full-wave rectifier 43 for providing a signal, which if of sufficient amplitude, actuates a maneuver rate control switch 44. The second channel comprises an amplifier 47 receiving the output of the aircraft maneuver sensor 40 and providing an amplified output to a full-wave rectifier 48 substantially similar to full-wave rectifiers 16 and 43. The output of the full-wave rectifier 48 is electrically connected to a maneuver control switch 49.

The maneuver rate control switch 44 comprises a double-pole double-throw relay actuated switch 45 having a relay coil 45a and a first set of contacts 45b and 45c and a second set of contacts 45d and 45e. The signal from the full-wave rectifier 43 is electrically connected to contactor 45d which in the deenergized condition, is electrically connected to contactor 45e to which one end of relay coil 45a is connected. The other end of the relay coil is connected to the ground potential. In parallel with the relay coil 45a is a timing network 46 comprising a series connected resistor 46a and a capacitor 46b. In shunt relation with the capacitor 46b is a resistor 46c.

The maneuver control switch 49 is similar to the maneuver rate control switch 44 comprising a double-pole double-throw relay actuated switch 50 having a relay coil 50a and contactors 50b–50e. Contactor 50b is electrically connected to ground and in the deenergized condition is not electrically connected to contactor 50c. Contactors 50c and 45c are electrically connected together by a conductor 52. Contactor 45b is connected to the output of the threshold detector 24 through a conductor 53. When either or both control switches 44 and 49 are in the deenergized condition, the output of the threshold detector 24 is unaffected; however, when both control switches are energized, the output of the threshold detector is short circuited. During this condition, the marker 30 is inhibited from marking the display circuits 31, and accordingly, the signal-like maneuver noise is prevented from erroneously indicating the presence of a submarine signal.

Having thus described a structural arrangement of the submarine anomaly marker, its operation will now be described with reference to FIGS. 1 and 2. Assume that an aircraft equipped with a magnetic airborne detection system 11 and a submarine anomaly marker as described above is flown on a straight and level course above the surface of a body of water. Assume further that the signal output or data from the magnetic airborne detection system appearing at point A on FIG. 1 and displayed on the display circuits 31 is similar to that illustrated in FIG. 2, line A. From this wave shape it can be readily seen that the unprocessed MAD data contains both high and low frequency signal components; but by appropriate filtering through the noise rejection filter 13, the low frequency signals are substantially reduced, as shown on line B of FIG. 2. After further processing through the noise rejection filter 15, the higher frequency noise signals are also reduced; this condition is illustrated on line C of FIG. 2. The signal inversion appearing on line C with respect to lines A and B is a result of the inversion characteristics of amplifier 14 and has no effect on the signal processing. The output of the filter 15 is then full-wave rectified and applied to the sampling integrator 17. The rectified signal is illustrated in line D of FIG. 2 wherein only positive signal lobes are present. The filtered signals are full-wave rectified so that during the subsequent integration in the sampling integrator, there will be no voltage cancellation as a result of integrating bi-polar signals.

Assuming that the relay coil 19a is in the energized condition as a result of the DC voltage applied to conductors 21 and 22, then the rectified signal appearing at the input of the sampling integrator 17 is integrated on capacitor 18b for a period of time determined by the time constant of the timing network 20. By selecting appropriate values for capacitor 20b and resistors 20a and 20c, the energized condition for the discharge circuit 19 can be varied. For example, a 2.5 second integration period is obtained by selecting capacitor 20b as 250 microfarads, resistor 20a as 33 ohms and resistor 20c as 10 megohms. Using these values, the rectified signal is integrated for a period of time equal to 2.5 seconds. At the end of this time, the voltage on capacitor 20b has reduced below the holding level of relay coil 19a and hence the relay reverts to its deenergized condition. Contacts 19d and 19e are then electrically connected together and discharge the voltage appearing across capacitor 18b. As the voltage on the timing network is reapplied through contactors 19b and 19c, capacitor 20b is again charged and the short circuit is removed from capacitor 18b, thereby causing the operation to be repeated.

A sampling integration time of approximately 2.5 seconds has been found to provide optimum submarine detection capabilities from the submarine anomaly marker; however, it is to be understood that greater or lesser integration times could be used, if so desired without deviating from the spirit of the present invention.

Figure 2:
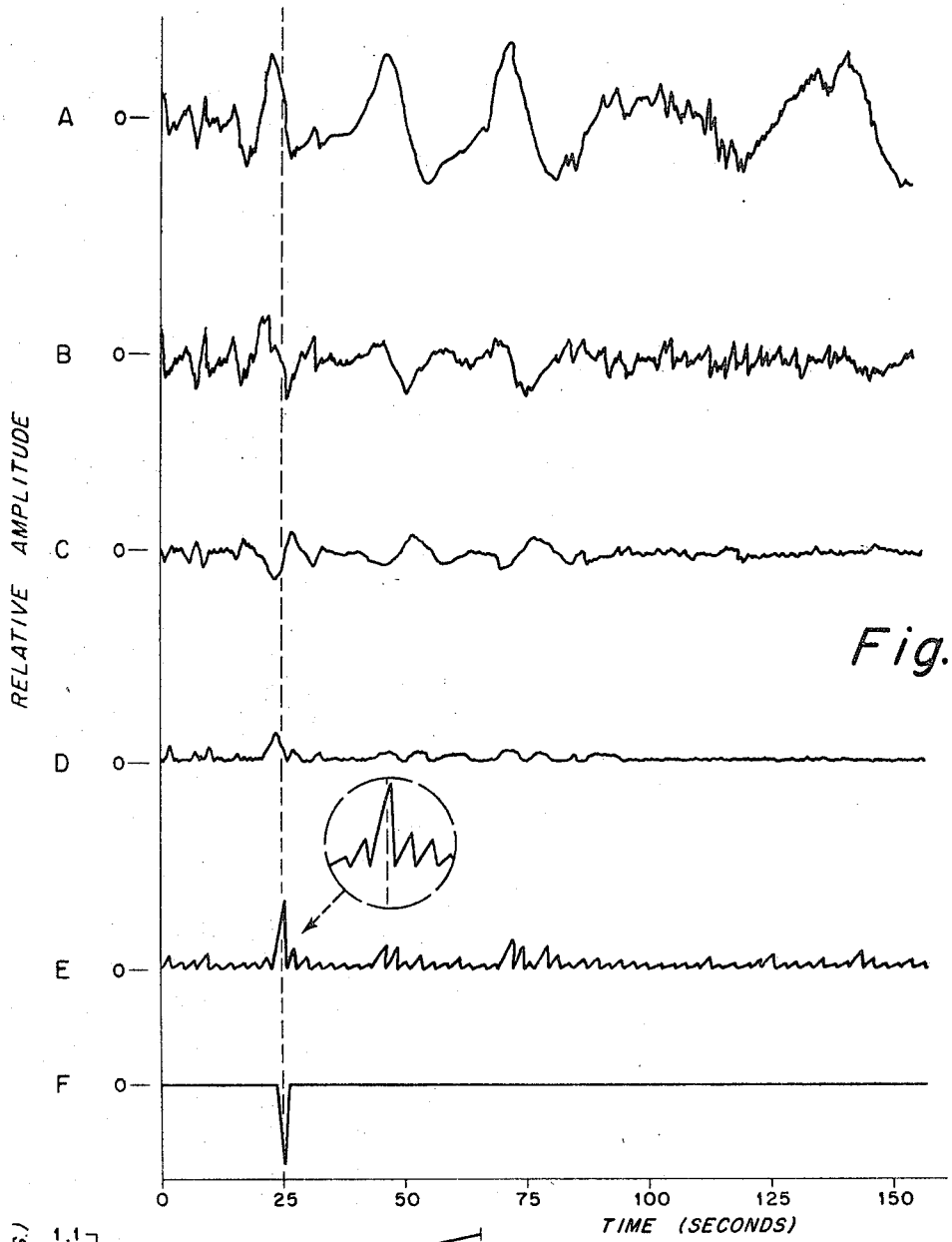
FIG. 2 shows typical wave shapes at various points in the embodiment of FIG. 1.

The wave shape appearing at the output of the sampling integrator 17 is shown in FIG. 2, line E. Comparing lines D and E of FIG. 2, it can be seen that the amplitude of the integrated voltage is proportional to the amplitude of the rectified signal. In particular, it should be noted that the amplitude of the integrated signal appearing at a time of 2.5 seconds is considerably greater than that appearing at any other time. By appropriately selecting the threshold level, as will be described hereinafter, this signal can be made to appear as an output from the threshold circuit while inhibiting all other lower amplitude signals. This condition is illustrated on line F of FIG. 2 by the negative pulse appearing in time coincidence with this integrated voltage. The signal inversion is a result of the amplifier 23 and has no other significance.

The particular threshold level selected is determined by considering the following two factors: (1) the desired signal recognition rate of the system, and (2) the desired false alarm rate of the system. The recognition rate is the ratio of the number of submarine signals detected to the number of submarine signals present to be detected, and the false alarm rate is a ratio of the number of false target indications to the number of hours of system operation. Ideally, it is desirable to have a high recognition rate and a low false alarm rate; however, the amplitude of the detected signal is not constant and therefore, it is necessary to set the threshold level low enough to enable low amplitude signal detection so that a high recognition rate may be achieved. By doing this, however, the probability of a noise signal exceeding the threshold level is greatly increased, and hence the false alarm rate will also increase. The converse of this situation is also true; that is, a low false alarm rate results in a low recognition rate. Since neither of these extreme conditions is desirable, there must be a compromise between the number of false alarms and the recognition rate. The degree of compromise depends upon the overall system performance that is desired. This decision rests with the operator of the system and may be varied merely by adjusting potentiometer 26.

Having selected the desired threshold level, the output of the threshold detector 24 is then applied to an amplifier 29 and marker 30 which provide an indication of the presence of a submarine signal by scribing a line on a recording chart, sounding an alarm, or sending a signal to a computer system, depending upon the particular type display system employed.

The aforementioned description assumed that the aircraft was flying along a straight and level course and accordingly, there were no signal-like aircraft maneuver noise signals encountered. Consider now the situation in which the aircraft is preparing to negotiate a turn. As described previously, during the dynamic portion of the turn, signal-like noise events occur which could erroneously indicate the presence of a submarine, therefore, it is necessary to inhibit the output of the threshold detector whenever $\theta$ exceeds a predetermined level. This function is provided by the inhibit circuitry described above.

As the aircraft negotiates a turn, the aircraft maneuver sensor 40 provides an output signal proportional to the amplitude of the wing bank angle $\theta$. To obtain $\dot{\theta}$, the wing bank angle, $\theta$, is differentiated in the differentiator circuit 41, amplified and full-wave rectified by the rectifier 43. The same output signal from the maneuver sensor 40 is also applied to an amplifier 47 and full-wave rectifier 48 for providing a signal to the maneuver control switch 49.

As the magnitude of the wing bank angle $\theta$ increases during the turn, the magnitude of the output voltage from the full-wave rectifier 48 also increases. When this voltage is of sufficient amplitude (as determined by the gain of amplifier 47) to actuate the maneuver control switch 49, contacts 50b and 50c will become electrically connected together. However, conductor 52 will not be connected to conductor 53 until the rate of change of wing back angle $\dot{\theta}$ is of sufficient amplitude (as determined by the gain of amplifier 42) to actuate the maneuver rate control switch 44. When this condition is attained, the output of the threshold detector 24 will be short circuited to ground through the maneuver rate control switch 44 and maneuver control switch 49. The output of the threshold detector 24 will remain short circuited until at least one timing network, 46 or 51, fails to provide sufficient holding current for its associated relay coil. This occurs when the dynamic portion of the turn is completed. The short circuit condition is then broken and the output of the threshold detector is unaffected.

During the condition in which the threshold detector is short circuited, it is possible that a submarine signal may be inhibited from marking the display circuit; therefore, to prevent this, it is necessary that the inhibition time, as determined by the timing networks 46 and 51, be minimized. This is readily achieved by merely shortening the time constants for the timing networks 46 and 51.

The invention thus described provides an apparatus which receives signal and signal-like noise information and automatically provides an immediate indication of the presence of a signal. The coordinates of the signal source can then be determined with a minimum amount of error and with a minimum false alarm rate.

It is to be understood, of course, that the foregoing disclosure relates to only an embodiment of the invention and that numerous modifications or alterations may be made therein without departing from the spirit and scope of the invention as set forth in the appended claims.

What is claimed is:

1. An apparatus for identifying signal anomalies in the presence of signal-like background noise comprising:
   input means adapted to receive a source of signal data;
   filter means receiving said data and attenuating the signal-like background noise from said data;
   means rectifying the output signal of said filter means and providing a series of unidirectional signal lobes;
   means integrating the unidirectional signal lobes;
   timing means for periodically dumping the integrated signal at selected time intervals; and
   detecting means receiving said dumped integrated signal for providing a signal indicating a signal anomaly when the amplitude of said dumped signal exceeds a predetermined level.

2. An apparatus as recited in claim 1 further comprising:
   means inhibiting the output from said detecting means in response to a predetermined condition.

3. An apparatus as recited in claim 2 wherein said inhibiting means comprises:
   means sensing the presence of a signal-like noise event and providing outputs proportional to the amplitude of said event and the rate of change of said event with time; and
   first and second switching means inhibiting the output of said indicating means in response to said outputs from said sensing means.

4. An apparatus as recited in claim 3 wherein said detecting means comprises:
   a threshold detector providing an output signal proportional to the amplitude difference between said dumped integrated signal and a selectively variable threshold level.

5. An apparatus as recited in claim 4 wherein said integrating means comprises:
   a resistor-capacitor network for integrating the unidirectional signal lobes.

6. An apparatus as recited in claim 5 wherein said timing means comprises:
   means periodically short circuiting said capacitor including a relay actuated switch; and
   a timing network operatively connected to the relay coil of said relay-actuated switch for establishing said selected time intervals.

7. An apparatus as recited in claim 6 further including:
   a display system for displaying said source of signal data; and
   means marking said display system in response to said output signal from said threshold detector whereby the presence of a signal is identified in a signal-like background noise.

8. In a magnetic airborne detection system for detecting submarine anomaly signals from an aircraft, an apparatus for automatically detecting the presence of a submarine comprising:
   filter means adapted to receive signals from said detection system and attenuate signal-like background noise from said received signals;
   rectifier means receiving the output of said filter means for providing a series of unidirectional signal lobes;
   means integrating said unidirectional signal lobes;
   timing means for periodically dumping the integrated signal at selected time intervals; and
   detecting means receiving said dumped integrated signal for providing a signal indicating a signal anomaly when the amplitude of said dumped signal exceeds a predetermined level.

9. An apparatus as recited in claim 8 further comprising:

means inhibiting said detecting means in response to a predetermined aircraft maneuver.

10. An apparatus as recited in claim 9 wherein said means inhibiting said detecting means comprises:
an aircraft maneuver sensor adapted to be connected to said aircraft for indicating the relative motion thereof;
means responsive to said sensor for providing a first output proportional to the magnitude of said aircraft motion and a second output proportional to the rate of change of aircraft motion with time; and
first and second switching means operatively connected to said first and second outputs for inhibiting said detecting means from falsely indicating the presence of a submarine signal.

11. An apparatus as recited in claim 10 wherein said detecting means comprises:
a threshold detector providing an output signal proportional to the amplitude difference between said dumped integrated signal and a selectively variable threshold level.

12. An apparatus as recited in claim 11 further including:
means displaying the output signal from said detection system; and
means marking said displaying means each time there is an output from said threshold detector.

13. An apparatus as recited in claim 12 wherein said integrator means comprises:
a resistor-capacitor network for integrating the unidirectional signal lobes.

14. An apparatus as recited in claim 10 wherein each of said first and second switching means comprise:
a relay actuated switch;
a timing network connected to the relay coil of said relay-actuated switch for maintaining the energized condition of said relay coil for a selectively variable time after the removal of an energized signal.

15. An apparatus as recited in claim 14 wherein each of said relay-actuated switches comprise:
first and second sets of contactors; and
conductor means connecting each of said first sets of contactors in series contacting relation with the output of said threshold detector during the energized condition of said relay coil whereby the output of said detector is inhibited.

16. An apparatus as recited in claim 13 wherein said timing means comprises:
means periodically short circuiting said capacitor including a relay-actuated switch; and
a timing network operatively connected to the relay coil of said relay-actuated switch for establishing said selected time intervals.

17. An apparatus as recited in claim 9 wherein said means inhibiting said detecting means comprises:
an aircraft maneuver sensor adapted to be connected to said aircraft for indicating the relative motion thereof; and
means responsive to said sensor for providing an output signal proportional to the rate of change of aircraft motion with time to thereby inhibit said detecting means.

References Cited

UNITED STATES PATENTS

| | | | |
|---|---|---|---|
| 2,907,012 | 9/1959 | Pitman et al. | 340—5 X |
| 3,159,807 | 12/1964 | Asbury | 340—6 |
| 3,202,968 | 8/1965 | Eady et al. | 340—5 X |
| 3,304,495 | 2/1967 | Brown | 324—77 |

RICHARD A. FARLEY, *Primary Examiner.*

U.S. Cl. X.R.

324—77